US009807580B1

United States Patent
Kaul et al.

(10) Patent No.: US 9,807,580 B1
(45) Date of Patent: Oct. 31, 2017

(54) EMERGENCY CALL HANDLING WITHIN IP MULTIMEDIA SYSTEM (IMS) NETWORKS

(71) Applicant: T-Mobile U.S.A., Inc., Bellevue, WA (US)

(72) Inventors: Mayank Kaul, Bellevue, WA (US); Shujaur Rehman Mufti, Snoqualmie, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 15/170,861

(22) Filed: Jun. 1, 2016

(51) Int. Cl.
*H04M 11/04* (2006.01)
*H04W 4/22* (2009.01)
*H04M 7/00* (2006.01)
*H04L 5/00* (2006.01)

(52) U.S. Cl.
CPC ............ *H04W 4/22* (2013.01); *H04L 5/0048* (2013.01); *H04M 7/006* (2013.01)

(58) Field of Classification Search
CPC ....... H04W 4/22; H04W 4/028; H04W 4/046; H04M 1/72536; H04M 1/72572; H04M 2242/04; H04M 2203/558; H04M 3/5116; H04M 7/1275
USPC .............................................. 455/404.1, 521
See application file for complete search history.

(56) References Cited

U.S. PATENT DOCUMENTS

| 2003/0108175 | A1 | 6/2003 | Poikselka et al. |
| 2004/0137873 | A1 | 7/2004 | Kauppinen et al. |
| 2014/0341210 | A1 | 11/2014 | LaCroix et al. |
| 2015/0172962 | A1* | 6/2015 | Watfa .................. H04W 48/06 370/235 |
| 2015/0181033 | A1 | 6/2015 | Keller et al. |

FOREIGN PATENT DOCUMENTS

WO    2008006055 A2    1/2008

OTHER PUBLICATIONS

International Searching Authority, International Search Report and Written Opinion, PCT Application PCT/US2017/034578, dated Aug. 31, 2017, 13 pages.

* cited by examiner

*Primary Examiner* — Ronald Eisner
(74) *Attorney, Agent, or Firm* — Perkins Coie LLP (57) ABSTRACT

Systems and methods are described herein for handling E911 communications within IMS networks, such as Voice over LTE (VoLTE) networks. In some embodiments, the systems and methods, via various communication nodes, handle or otherwise govern emergency calls within the VoLTE network, by sending an INVITE message from a sender node of the VoLTE network to a recipient node of the VoLTE network, and starting a retry timer at the sender node that is specific to handling E911 calls by the VoLTE network.

14 Claims, 5 Drawing Sheets

EMERGENCY CALL HANDLING WITHIN IP MULTIMEDIA SYSTEM (IMS) NETWORKS

BACKGROUND

Current Third Generation Partnership Projects networks, or 3GPP, provide general timing mechanisms when handling calls or messages (e.g., INVITE and non-INVITE messages) between nodes of the networks. For example, a typical 3GPP network, such as a Voice Over LTE network, or VoLTE, governs all calls using standard overarching timers, such as SIP (Session Initiation Protocol) Timer B, which is set at a maximum time within which a sender node will wait for an INVITE message to be acknowledged by a recipient node.

Another timer is Timer F, which sets the time a sender node will wait for a non-INVITE message (REFER, BYE, CANCEL, and so on) to be acknowledged by a recipient node of the network. These timers are typically set at 64 times T1 (which is the time it takes an IP packet to make a round trip between nodes, or 500 milliseconds), or 32 seconds.

DETAILED DESCRIPTION

Systems and methods are described herein for handling emergency or E911 communications within IMS networks, such as Voice over LTE (VoLTE) networks. Unlike typical call handling within VoLTE networks, which rely on common SIP timers to govern all calls within the networks, the systems and methods configure, provision, and/or establish emergency call specific timers, which govern E911 calls within a VoLTE network.

In some embodiments, the systems and methods, via various communication nodes, handle or otherwise govern emergency calls within the VoLTE network, by sending an INVITE message from a sender node of the VoLTE network to a recipient node of the VoLTE network, and starting a retry timer at the sender node that is specific to handling E911 calls by the VoLTE network.

When an acknowledgement message is received by the sender node from the recipient node before the retry timer ends, the sender node provisions the recipient node to handle the E911 call placed by the user of the mobile device, and when an acknowledgement message is not received by the sender node from the recipient node before the retry timer ends, the sender node sends another INVITE message from the sender node to a different recipient node of the VoLTE network, in order to attempt to complete the E911 call.

For example, a communication node of the VoLTE network may include a communication module that sends INVITE messages to recipient nodes in response to receiving E911 call provisioning requests, and a timer module that sets an E911 call specific timer associated with receiving acknowledgement messages from recipient nodes of sent INVITE messages. In some cases, the E911 call specific timer may be configured for the specific communication node.

The communication node, therefore, may include a timer module that sets a generic call specific retry timer for generic calls placed to the telecommunications network (e.g., Timer B under the SIP protocol), and an E911 call specific retry timer for E911 calls placed to the telecommunications network, where the E911 call specific timer is associated with receiving acknowledgement messages from recipient nodes of sent INVITE messages that are based on the E911 calls placed to the telecommunications network.

Thus, by providing configurable emergency call specific timers within various communication nodes, a VoLTE, or other IMS network, enables network operators and device users to control retransmissions of call provisioning sessions during emergency call scenarios, which prevents or minimizes waiting periods associated with completing E911 and other time-sensitive voice calls within the IMS networks, among other benefits.

The following description provides specific details for a thorough understanding of, and enabling description for, various embodiments of the technology. One skilled in the art will understand that the technology may be practiced without these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Example Network Configurations

Figure 1:
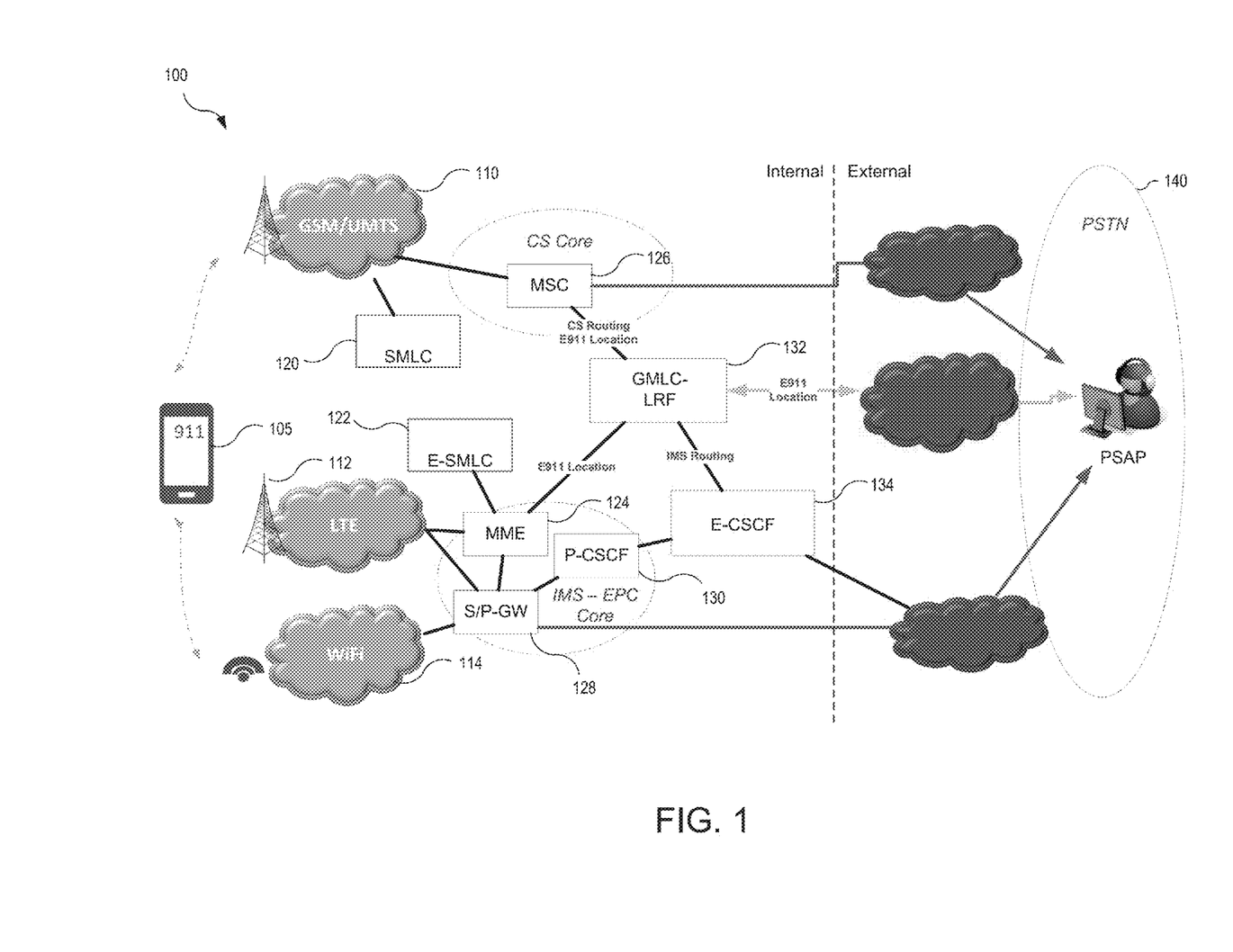
FIG. 1 illustrates aspects of a suitable network environment that facilitates E911 call handling within a VoLTE network.

FIG. 1 illustrates aspects of a sample network environment 100 that enable E911 call handling within a VoLTE network. A mobile device 105 or other user equipment (UE), such as a smart phone, tablet, laptop, and so on, may place calls to an IP Multimedia System (IMS) network, such as a VoLTE network. For example, the mobile device 105 may access the VoLTE network via various different access networks, such as a Global System for Mobile (GSM) network or Universal Mobile Telecommunications System (UMTS) network 110, a Long Term Evolution (LTE) network 112, one or more wireless network 114, and so on.

The wireless networks 114 may employ any type of wireless protocol, including wireless local, wide, and metropolitan area network (WLAN, WWAN, WMAN, respectively) access protocols. For example, wireless protocols can include IEEE 802.16 (WiMAX), IEEE 802.20 Mobile Broadband Wireless Access (MBWA), Ultra Wideband (UWB), 802.11 wireless fidelity (Wi-Fi), Bluetooth standards, or other similar standards.

Each of the networks provides components and/or nodes configured and specific for handling E911 and other emergency calls placed by the mobile device 105. For example, the GSM/UMTS network 110 receives and handles E911 calls via a Mobile Switching Center (MSC) 126 component and a Serving Mobile Location Center (SMLC) 120.

An IMS-EPC (Evolved Packet Core) set of components handles calls placed to the IMS network via the LTE network 112 or wireless networks 114. For example, a Mobile Management Entity (MME) acts as a control node for the LTE network 112 (and, in some cases, communicates with an emergency SMLC, or E-SMLC 122), and a Serving Gateway and Packet Data Network Gateway (S/P-GW, or SGW and PGW) 128 acts to serve and/or control data packets received via the wireless networks 114.

Thus, the mobile device 105 may access an IMS network via various access gateway servers, such as a Gateway GPRS Support Node (GGSN) for General Packet Radio Service (GPRS), a Packet Data Gateway (PDG) for WiFi, Systems Architecture Evolution Gateway (SAE-GW), a Packet Data Network Gateway (PDN-GW) for 3GPP Long Term Evolution (LTE), and so on.

To ease the integration of the IMS network with Internet resources, various specifications (e.g., 3GPP specifications) use Internet Engineering Task Force protocols within the IMS network. An example of one such protocol is session initiation protocol (SIP). SIP is a signaling protocol used for creating, modifying and terminating two-party or multiparty sessions consisting of one or several media streams. Endpoints, such as access points, register with the IMS network in order to use IMS services.

The IMS network includes a Call Session Control Function (CSCF), which provides various SIP servers or proxies for processing signaling packets, performing communication session controls, hosting and executing services, and so on. For example, the IMS network includes a Proxy-CSCF (P-CSCF) 130, which acts as a first contact point or gateway for communications from the LTE network 112 and/or wireless networks 114. The IMS network may also include a Serving-CSCF (not shown), which performs session controls as the central node of the signaling plane of the IMS network, multiple application servers that provide application services, media servers, charging systems, and so on.

When E911 calls (and other emergency or time-sensitive) calls are placed by the mobile device 105, the P-CSCF directs the calls to an Emergency CSCF, or E-CSCF 134. The E-CSCF 114 controls the handling of emergency calls through the IMS network, such as by connecting E911 calls to a public safety access point (PSAP) 140 provided via a publically switched telephone network (PSTN). A PSAP 140 may be part of a call center or other entity that handles calls associated with police, firefighting, and/or ambulance services.

The IMS network also includes components configured to identify and obtain a location of the mobile device 105, such as a Location Retrieval Function (LRF) node 132 that receives location information from the MME 124 and/or the MSC 126. The LRF 132 sends the location information to the PSAP 140, to assist in locating the user, associated with the mobile device 105, who placed the emergency call.

For example, a user places an E911 call via her mobile device 105. The wireless network 114 receives the call, and routes the call via one or more gateway nodes (S/P-GW 128) to the Proxy-CSCF 130, which transfer the call to the E-CSCF 134, for provisioning and forwarding to the PSAP 140, which is the endpoint of the call.

As described herein, the IMS network establishes, sets, and applies various retry timers associated with retransmissions of INVITE messages and non-INVITE messages between nodes within the environment 100. For example, for all regular calls, the IMS network may provision standard-based SIP Timers (e.g., SIP Timer B) to govern INVITE messages between nodes, and standard-based SIP Timers (e.g., SIP Timer F) to govern non-INVITE messages between nodes.

However, in order to ensure the efficient, fast handling of emergency calls and other priority or time-sensitive calls (e.g., high quality of service calls or sessions) within the IMS network, the systems and methods described herein have established emergency and other specialized call specific timers utilized between one or more node interfaces of the IMS network (e.g., a specific timer for messages sent between the P-CSCF node 130 and the E-CSCF node 134).

Therefore, while the term "emergency calls" is used herein for convenience, the term is to cover all sessions having higher priority, such as other time-sensitive calls or sessions, high quality of service calls or sessions, and so on. Further details regarding emergency call specific timers will be described herein.

FIG. 1 and the discussion herein provide a brief, general description of a suitable computing environment 100 in which the systems and methods can be supported and implemented. Although not required, aspects of the systems and methods are described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: Internet appliances, handheld devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

In some embodiments, the mobile device 105 may include network communication components that enable the mobile device 105 to communicate with remote servers or other portable electronic devices by transmitting and receiving wireless signals using a licensed, semi-licensed, or unlicensed spectrum over communications network, such as network. In some cases, the communication network may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. As described herein, the communications network may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), Long Term Evolution (LTE) network), Voice over LTE (VoLTE), IMS network, or other communications network.

Examples of Provisioning E911 Call Specific Timers

Figure 2A:
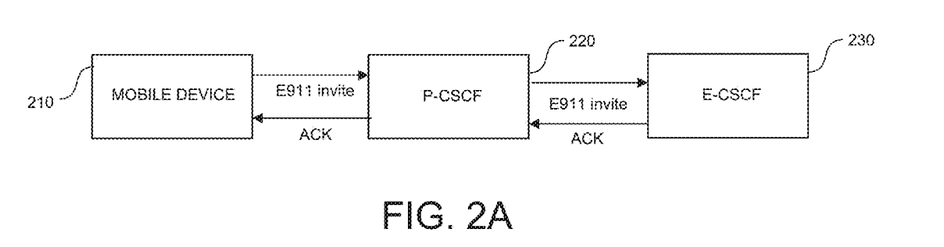
FIGS. 2A-2B are block diagrams illustrating interactions between components of a VoLTE network during an E911 voice call.
Figure 2B:
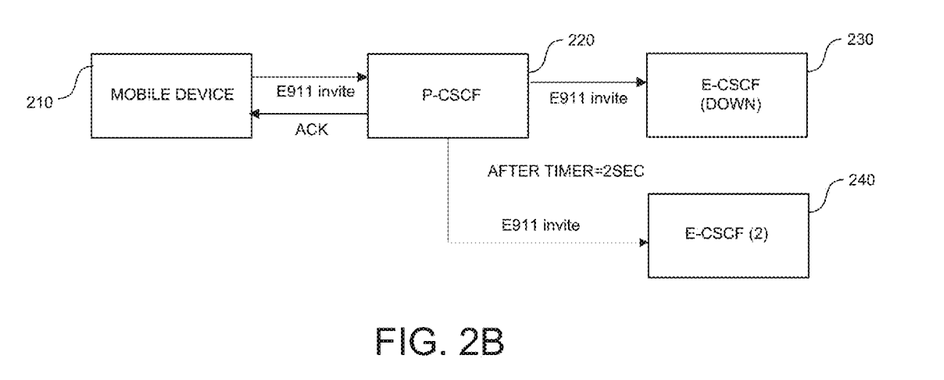

As described herein the systems and methods provide E911 specific retry timers for INVITE messages and other communications between nodes of an IMS network during the provisioning and completion of an emergency voice call from the mobile device 105 to the PSAP 140 via the IMS network. FIGS. 2A-2B illustrate interactions between components of a VoLTE network during an E911 voice call.

Referring to FIG. 2A, a mobile device 210 places an E911 voice call. Once the call is placed, the mobile device 210 sends an INVITE message to a P-CSCF 220 node of the IMS network. A connection is established when the P-CSCF 220 node sends an acknowledgement message ACK back to the mobile device 210 within a time period (e.g., 2 seconds) set by a retry timer configured specifically to handle E911 calls (and associated INVITE and/or non-INVITE messages) between the device 210 and the node 220.

The P-CSCF 220, in turn, sends an INVITE message to an E-CSCF node 230 of the IMS network. The E-CSCF sends an acknowledgement message ACK back within a time period set by a retry timer configured specifically to handle E911 calls between the P-CSCF node 220 and the E-CSCF node 230. The E-CSCF node 230 may then direct the call via other nodes to the PSAP 140.

In FIG. 2B, the P-CSCF 220 sends an INVITE message to the E-CSCF node 230 of the IMS network, but does not receive an acknowledgement message within a time period set by a retry timer configured specifically to handle E911 calls between the P-CSCF node 220 and the E-CSCF node 230. For example, the E-CSCF 230 may be down or non-functional. Once the timer ends (e.g., 2 seconds have elapsed), the P-CSCF 220 sends another INVITE message to a different E-CSCF node (2) 240 of the IMS network, in order to quickly identify and provision an alternative E-CSCF node to handle the E911 call.

Figure 3:
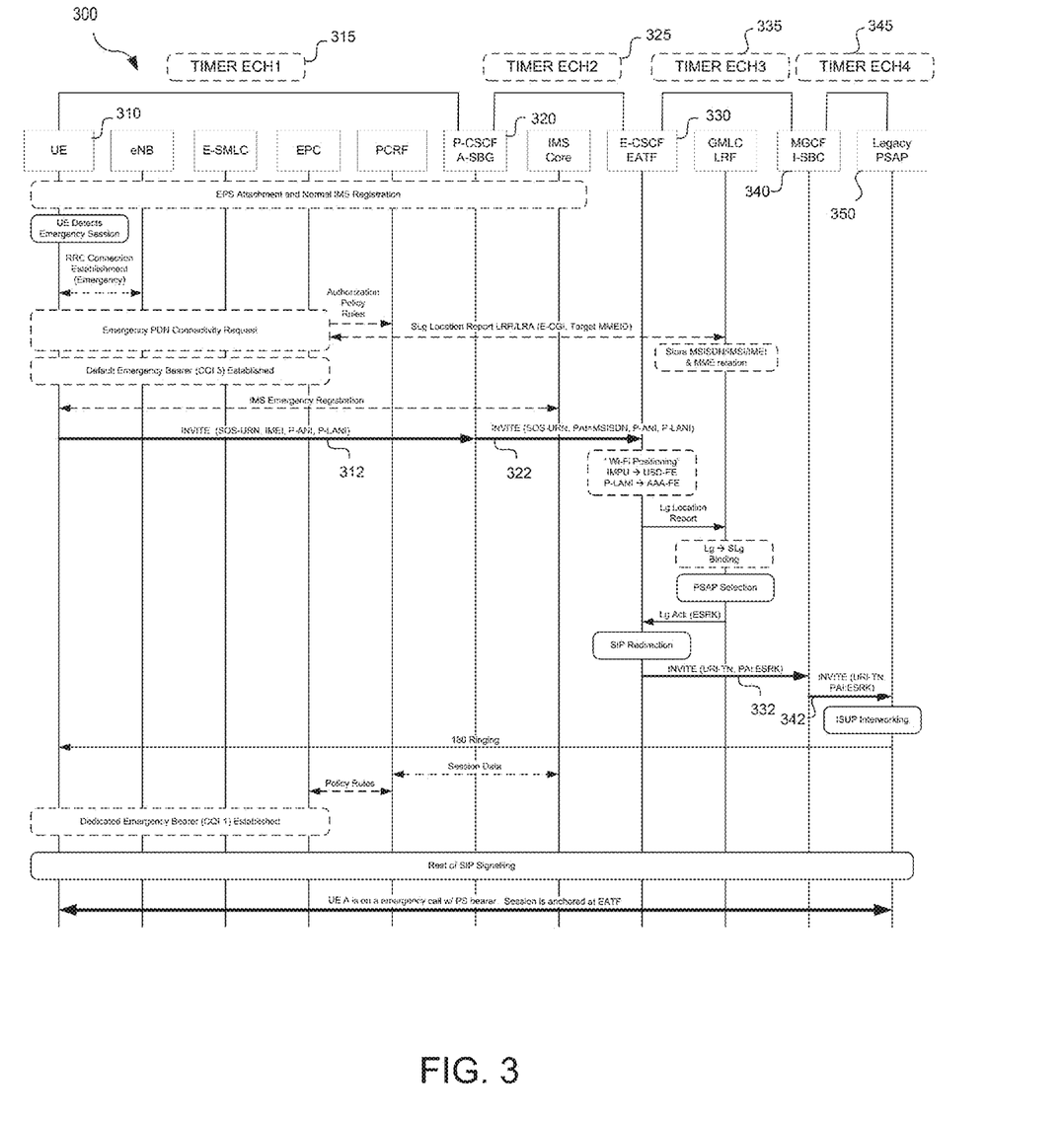
FIG. 3 is a diagram illustrating an application of E911 specific timers to call sessions within a VoLTE network.

Thus, in some embodiments, the emergency call retry timer specifically configured to govern emergency calls may be specific to various interfaces (sender node to recipient node) within the IMS network. FIG. 3 is a diagram 300 illustrating an application of E911 specific timers to call sessions within a VoLTE network.

The User Equipment 310 first detects an emergency session (e.g., a user dials "911"), and attempts to establish an initial session between the UE 310 and a P-CSCF node 320 of the IMS network. The UE 312 send an INVITE message to a P-CSCF node 320, and sets a timer ECH1 315 that is specific to the INVITE message between the UE 310 and the P-CSCF node 320. The session is established when the UE 310 receives an acknowledgement message from the P-CSCF node 320 before the Timer ECH1 315 ends.

Next, the P-CSCF 320 sends an INVITE message 322 to an E-CSCF node 330 of the IMS network, and sets a timer ECH2 325 that is specific to the INVITE message between the P-CSCF node 320 and the E-CSCF node 330. The session is established when the P-CSCF node 320 receives an acknowledgement message from the E-CSCF node 330 before the Timer ECH2 325 ends.

Then, the E-CSCF 330 sends an INVITE message 332 to a MGCF node 340 of the IMS network, and sets a timer ECH3 335 that is specific to the INVITE message between the E-CSCF node 330 and the MGCF node 340. The session is established when the E-CSCF node 330 receives an acknowledgement message from the MGCF node 330 before the Timer ECH3 335 ends.

Finally, the MGCF node 340 sends an INVITE message 342 to a PSAP node 350 of the IMS network, and sets a timer ECH4 345 that is specific to the INVITE message between the MGCF node 340 and the PSAP node 350. The session is established when the MGCF node 340 receives an acknowledgement message from the PSAP node 350 before the Timer ECH4 345 ends. At this point, the emergency call between the UE 310 and the PSAP 350 is completed.

Figure 4:
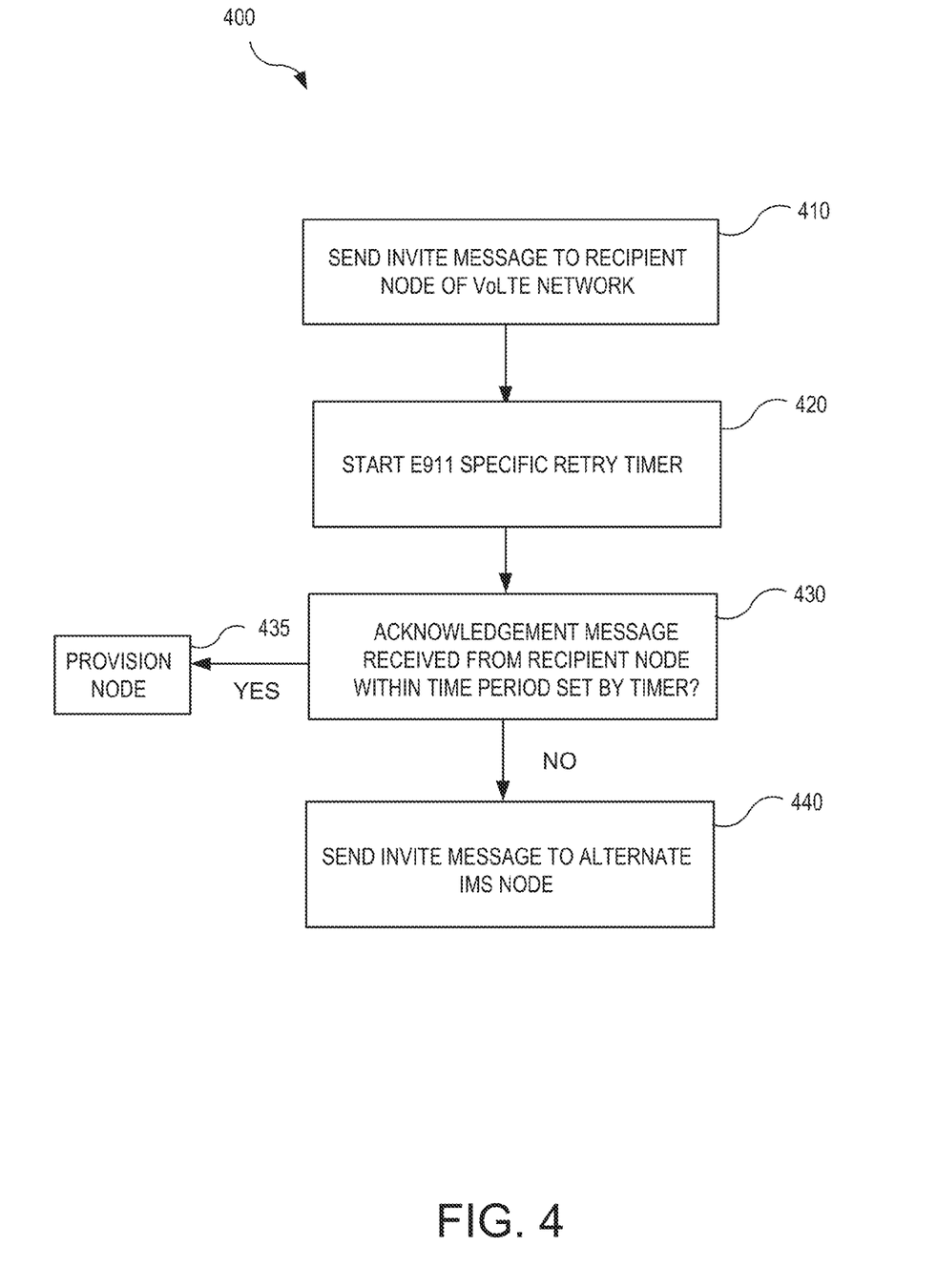
FIG. 4 is a flow diagram illustrating a method of handling an E911 call within an IMS network.

As described herein, the systems and methods perform various operations or methods when attempting to connect E911 voice calls over an IMS network, such as the VoLTE network. FIG. 4 is a flow diagram illustrating a method 400 of handling an E911 call within an IMS network. The method 400 may be performed by a communication node of an IMS network and, accordingly, is described herein merely by way of reference thereto. It will be appreciated that the method 400 may be performed on any suitable hardware.

In operation 410, the communication node sends an INVITE message from a sender node of the VoLTE network to a recipient node of the VoLTE network. As described herein, the INVITE message is based on an E911 call being placed by a user of a mobile device connected to the VoLTE network.

In operation 420, the communication node starts a retry timer at the sender node that is specific to handling E911 calls by the VoLTE network. For example, the retry timer is specific to handling INVITE messages associated with E911 calls by the VoLTE network, and thus sets a time period (e.g., 1 or 2 seconds) that is less than the time period set by SIP timer B (e.g., 32 seconds) that handles INVITE messages for all other calls between nodes of the VoLTE network.

In some embodiments, the retry timer may be specific to governing emergency and other time-sensitive calls within the network, and may be specific to the communication node sending the INVITE message. For example:

When the sender node is a proxy call session control function (P-CSCF) node of the VoLTE network, and the recipient node is an emergency call session control function (E-CSCF) node of the VoLTE network, the retry timer is specific to handling E911 calls within the P-CSCF/E-CSCF interface of the network;

When the sender node is an access point via which the mobile device connects to the VoLTE network, and the recipient node is a proxy call session control function (P-CSCF) node of the VoLTE network, the retry timer is specific to handling E911 calls within the access point/P-CSCF interface of the network;

When the sender node is an emergency call session control function (E-CSCF) node of the VoLTE network and the recipient node is a media gateway control function (MGCF) node of the VoLTE network, the retry timer is specific to handling E911 within the E-CSCF/MGCF interface of the network;

When the sender node is a media gateway control function (MGCF) node of the VoLTE network and the recipient node is a public safety answering point (PSAP) node that receives the E911 call from the VoLTE network, the retry timer is specific to handling E911 calls within the MGCF/PSAP interface of the network; and so on.

In operation 430, the communication node determines whether an acknowledgement message is/was received from the recipient node within a time period set by the E911 call specific retry timer. When an acknowledgement message is received by the sender node from the recipient node before the retry timer ends, the node, in operation 435, provisions the recipient node to handle the E911 call placed by the user of the mobile device.

In operation 440, when an acknowledgement message is not received by the sender node from the recipient node before the retry timer ends, the communication node sends another INVITE message to a different or alternative recipient node of the VoLTE network.

Thus, in some embodiments, a communication node is specifically configured to set a retry timer for INVITE messages that is specific to the type of node (e.g., a P-CSCF node) and that governs E911 and other time-sensitive communications. The communication node, therefore, may include a connection module that sends INVITE messages to recipient nodes in response to receiving E911 call provisioning requests, and a timer module that sets an E911 call specific timer associated with receiving acknowledgement messages from recipient nodes of sent INVITE messages.

Figure 5:
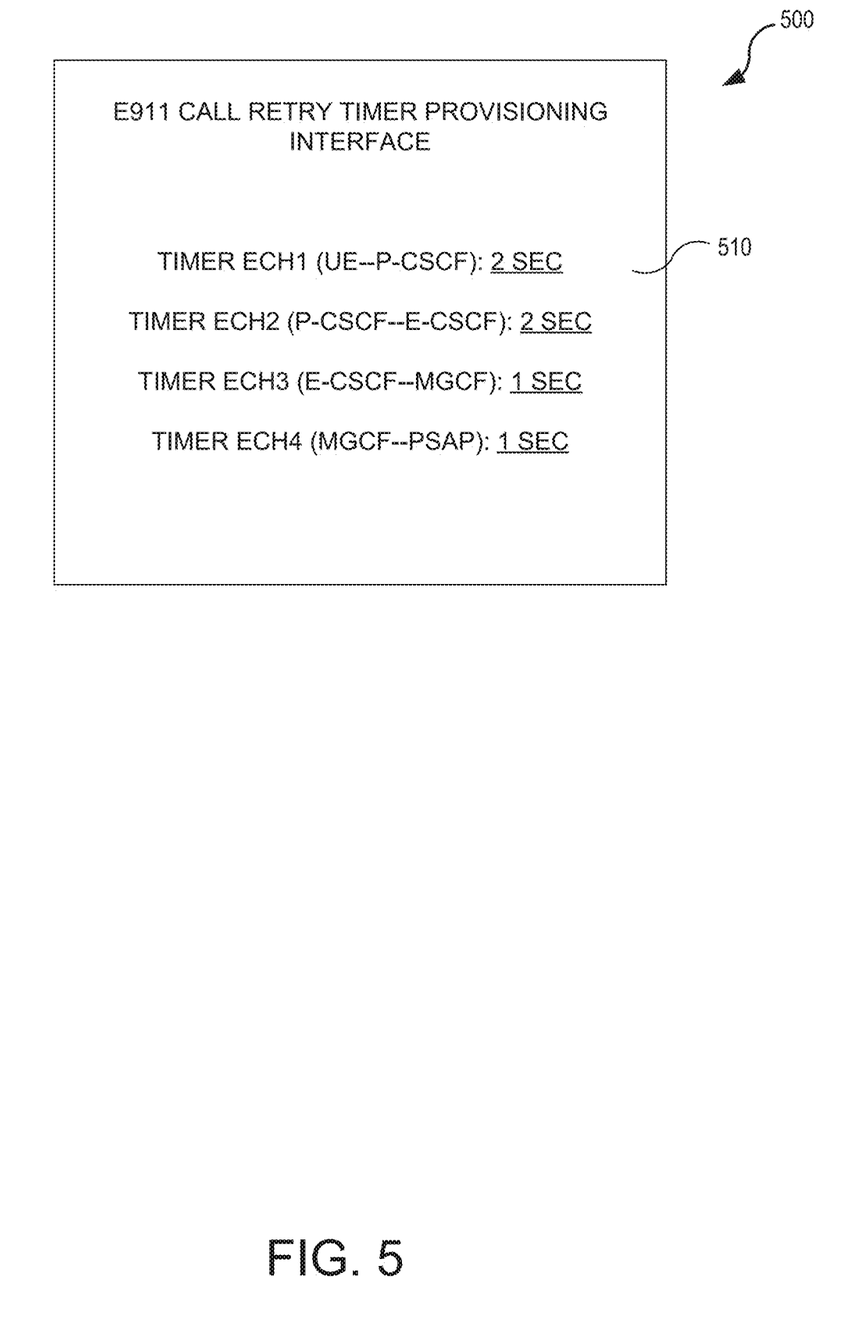
FIG. 5 is a display diagram illustrating an interface for configuring E911 specific timers for a VoLTE network.

As described herein, the systems and methods, in some embodiments, enable network operators to establish, set, and/or provision various different retry timers for INVITE and other call signaling provisioning messages sent between nodes of an IMS network. FIG. 5 is a display diagram illustrating an interface 500 for configuring E911 specific timers for a VoLTE network.

The interface 500 displays information associated with timers 510 established for call provisioning between various nodes of the IMS network, including a "TIMER ECH1," which is provisioned to be 2 seconds for a UE-P-CSCF interface, a "TIMER ECH2," which is provisioned to be 2 seconds for a P-CSCF-E-CSCF interface, a "TIMER ECH3," which is provisioned to be 1 seconds for a E-CSCF-MGCF interface, and a "TIMER ECH4," which is provisioned to be 1 seconds for a MGCF-PSAP interface, among other interfaces. Via the interface, a network operator may select and modify or configure the different retry timers, as desired.

For example, the systems may configure or set timers in a variety of ways. In addition to user-configurable timers, the systems may configure a duration of one or more timers based on current or previously measured network and/or transport latencies between nodes, based on loads applied to one or more nodes, based on measured or detected node response times, and so on. Therefore, a communication node may have a time that is set at one value (e.g., 2 seconds), and later modified based on network conditions (e.g., from 2 to 1.5 seconds).

Of course, the systems and methods may implement other timers not explicitly depicted by the interface 500, or utilize only a few of the timers depicted in interface 500.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively or additionally, network elements performing those functions could be replaced by two or more elements to perform portions of those functions. In addition, while processes, message/data flows, or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the technology.

What is claimed is:

1. A method for handling emergency calls within a Voice over LTE (VoLTE) network, the method comprising:
   sending an INVITE message from a sender node of the VoLTE network to a recipient node of the VoLTE network,
      wherein the INVITE message is based on an E911 call being placed by a user of a mobile device connected to the VoLTE network;
   starting a retry timer at the sender node,
      wherein a duration of the retry timer is specific to handling E911 calls by the VoLTE network and specific to handling INVITE messages between the sender node and the recipient node; and
   when an acknowledgement message is received by the sender node from the recipient node within the duration of the retry timer, provisioning the recipient node to handle the E911 call placed by the user of the mobile device; and
   when an acknowledgement message is not received by the sender node from the recipient node within the duration of the retry timer, sending another INVITE message from the sender node to a different recipient node of the VoLTE network.

2. The method of claim 1, wherein the sender node is a proxy call session control function (P-CSCF) node of the VoLTE network, and the recipient node is an emergency call session control function (E-CSCF) node of the VoLTE network, and wherein the duration of the retry timer is specific to handling E911 calls by a P-CSCF/E-CSCF interface.

3. The method of claim 1, wherein the sender node is an access point via which the mobile device connects to the VoLTE network, and the recipient node is a proxy call session control function (P-CSCF) node of the VoLTE network, and wherein the duration of the retry timer is specific to handling E911 calls by an access point/P-CSCF interface.

4. The method of claim 1, wherein the sender node is an emergency call session control function (E-CSCF) node of the VoLTE network and the recipient node is a media gateway control function (MGCF) node of the VoLTE network, and wherein the duration of the retry timer is specific to handling E911 calls by a E-CSCF/MGCF interface.

5. The method of claim 1, wherein the sender node is a media gateway control function (MGCF) node of the VoLTE network and the recipient node is a public safety answering point (PSAP) node that receives the E911 call from the VoLTE network, and wherein the duration of the retry timer is specific to handling E911 calls by a MGCF/PSAP interface.

6. The method of claim 1, wherein the duration of the retry timer specific to handling INVITE messages associated with E911 calls by the VoLTE network is less than a duration of a SIP timer B that governs other INVITE messages between nodes of the VoLTE network.

7. The method of claim 1, wherein the duration of the retry timer is configured by an administrator of the VoLTE network.

8. A non-transitory computer-readable medium whose contents, when executed by a computing system of a Voice over LTE (VoLTE) network, cause the computing system to perform a method for handling emergency calls within the VoLTE network, the method comprising:
   sending an INVITE message from a sender node of the VoLTE network to a recipient node of the VoLTE network,
      wherein the INVITE message is based on an E911 call being placed by a user of a mobile device connected to the VoLTE network;
   starting a retry timer at the sender node that is specific to handling E911 calls by the VoLTE network; and
   when an acknowledgement message is received by the sender node from the recipient node before the retry timer ends, provisioning the recipient node to handle the E911 call placed by the user of the mobile device; and
   when an acknowledgement message is not received by the sender node from the recipient node before the retry timer ends, sending another INVITE message from the sender node to a different recipient node of the VoLTE network.

9. The computer-readable medium of claim 8, wherein the sender node is a proxy call session control function (P-CSCF) node of the VoLTE network, and the recipient node is an emergency call session control function (E-CSCF) node of the VoLTE network, and the retry timer is specific to handling E911 calls by a P-CSCF/E-CSCF interface.

10. The computer-readable medium of claim 8, wherein the sender node is an access point via which the mobile device connects to the VoLTE network, and the recipient node is a proxy call session control function (P-CSCF) node of the VoLTE network, and wherein the retry timer is specific to handling E911 calls by an access point/P-CSCF interface.

11. The computer-readable medium of claim 8, wherein the sender node is an emergency call session control function (E-CSCF) node of the VoLTE network and the recipient node is a media gateway control function (MGCF) node of the VoLTE network, and wherein the retry timer is specific to handling E911 calls by a E-CSCF/MGCF interface.

12. The computer-readable medium of claim 8, wherein the sender node is a media gateway control function (MGCF) node of the VoLTE network and the recipient node is a public safety answering point (PSAP) node that receives the E911 call from the VoLTE network, and wherein the retry timer is specific to handling E911 calls by a MGCF/PSAP interface.

13. The computer-readable medium of claim 8, wherein the retry timer specific to handling INVITE messages associated with E911 calls by the VoLTE network is less than a SIP timer B that handles other INVITE messages between nodes of the VoLTE network.

14. The computer-readable medium of claim 8, wherein the retry timer is implemented at the sender node and is specific to handling INVITE messages sent by the sender node to the recipient node.

\* \* \* \* \*